Figure 1:
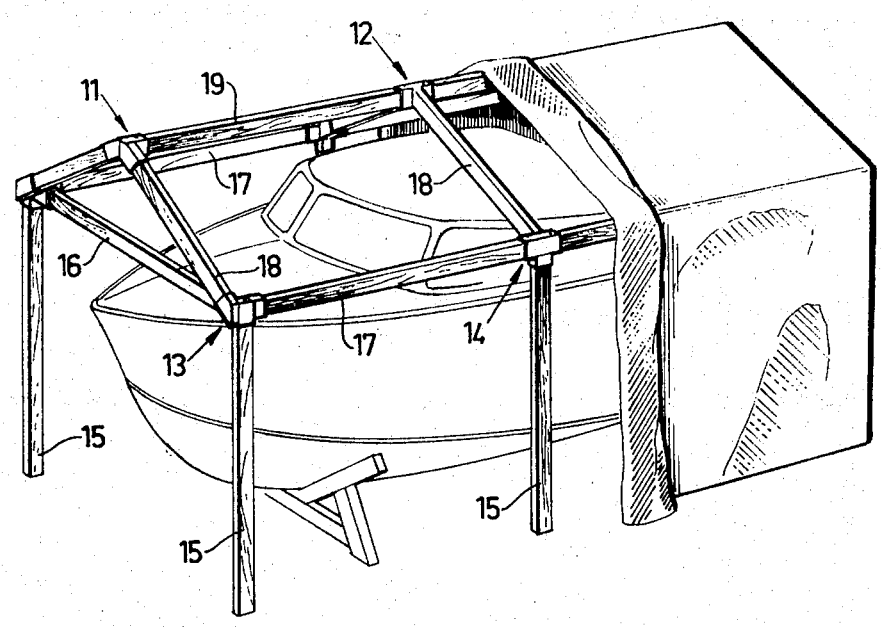

United States Patent [19]
Tellberg

[11] 3,740,084
[45] June 19, 1973

[54] READILY DETACHABLE SELF-ALIGNING JOINT

[76] Inventor: Klas Olof Tellberg, Rattarbacken 6, Saltsjo-Duvnas, Sweden

[22] Filed: Aug. 23, 1971

[21] Appl. No.: 173,899

[52] U.S. Cl. ........ 287/20.927, 287/54 A, 287/53.5, 182/204, 52/645
[51] Int. Cl. ............................................. F16b 7/04
[58] Field of Search ............... 287/54 A, 189.36 D, 287/189.36 C, 20.92 C, 20.95, 20.92 D, 20.92 R, 20.924, 20.925, 20.926, 53.5, 20.927; 182/204; 211/177, 182; 306/1.5, 1.6, 26; 52/632, 641, 645

[56] References Cited
UNITED STATES PATENTS

| 1,461,302 | 7/1923 | Beall | 306/1.5 |
|---|---|---|---|
| 1,682,671 | 8/1928 | Gooding | 182/204 X |
| 3,068,030 | 12/1962 | Ransom | 287/20.924 X |
| 2,931,129 | 4/1960 | Boniface | 287/20.95 X |
| 1,555,847 | 10/1925 | Hudson | 287/20.94 X |
| 797,474 | 8/1905 | Walker | 287/20.94 X |
| 1,622,746 | 3/1927 | Truemper | 287/20.95 UX |
| 2,874,708 | 2/1959 | Daus | 287/20.95 X |
| 3,534,515 | 10/1970 | Beed | 287/20.92 C X |
| 2,386,161 | 10/1945 | Hawes | 287/189.36 C |

FOREIGN PATENTS OR APPLICATIONS

| 6,053 | 1895 | Great Britain | 287/20.924 |
|---|---|---|---|
| 1,191,091 | 10/1959 | France | 287/20.95 |
| 233,514 | 4/1961 | Australia | 287/20.95 |
| 897,000 | 9/1953 | Germany | 287/20.95 |

*Primary Examiner*—David J. Williamowsky
*Assistant Examiner*—Wayne L. Shedd
*Attorney*—Richard S. Sughrue, Gideon Franklin Rothwell and John H. Mion et al.

[57] ABSTRACT

For releasably joining of crossbars and posts in stands, for instance for forming stages to cover boats which are laid up on land, a joint element comprises a body forming a corner joint in the stand and showing cavities with different directions which are intended to receive the crossbars and which have recesses running at tight angle to the cavity directions so as to receive said projections, the cavities having further a greater cross-section than the crossbars, whereby, by actuating of set screws between the crossbars etc., and the joint elements in the direction of the corresponding projections, said projections are put into or out of engagement with the recesses for individual keeping or releasing of the crossbars.

6 Claims, 5 Drawing Figures

PATENTED JUN 19 1973 3,740,084

READILY DETACHABLE SELF-ALIGNING JOINT

The invention relates to joint elements for releasably joining of crossbars, posts, rods and the like in stands or frameworks.

During winter storing, for instance, the boats have to be protected against weather and wind. This is usually done by means of a tarpaulin placed over relatively plain stages placed on the boat. In this way just the boats are effectively protected but the outfit work, which has to be done before the launching of the boats, can be done only to a slight extent without the tarpaulin and possibly also the stages being removed. At most of the boat yards, where the boat owners do the outfit work themselves, said work has be to finished in early spring, so that the launching of the boats can be done without any disturbing outfit work. This has caused the use of relatively high stages so that the work can be done underneath said stages without the tarpaulins being taken away. Such stages may be mounted in such a way, that they can hardly be demounted after the winter season, but at several boat yards the stages must have to be dismounted before the summer season and kept stored at an indicated place.

Lately pipe stages are used to a relatively large extent. The different pipe parts can thereby be joined together by means of braces or pipe connections of the type of multi direction knots. Such stages show many advantages but they are expensive to acquire as well as heavy to handle in connection with mounting and dismounting. They have thus been used almost solely at those boat yards where the stages are allowed to remain at their site during the summer season.

In order to bring about easily dismounted stages of the kind aimed at, wooden crossbars and wooden stands are used to a great extent, by which an ordinary stage consists of three crossbars parallel with the longitudinal direction of the boat and mounted on posts which are resting on the ground and shored sideways. The middle cross bar is hereby placed midship at a suitable height over the boat deck and the two other ones at about the same level as the railing, just outside the same. Crossbars serving to support a tarbaulin over the stage are thereafter placed between the middle and the two outermost crossbars at suitable distance from each other.

The joining of such crossbars so as to form stable but easily releasable joints constitute a problem, which the present invention is intended to solve. According to the invention a joint element for releaseably joining of crossbars, posts, rods and the like in stands or frameworks for this purpose comprises a body forming a corner joint in the stand or in the framework, showing cavities having different directions and intended to receive the crossbars etc., and provided with recesses mainly running in right angle against the cavity direction for receiving projections fixed to the crossbars etc. The invention is mainly characterized in that the cavities have a greater cross section than the crossbars etc., whereby the projections, by actuating of set screws between the crossbars etc. and the joint element adjustable in the direction of the projections, are put into or out of engagement with the recesses in order to individually keep or release each one of the crossbars etc.

According to an advantageous further embodiment of the invention a joint element is formed of three or more casings which are joined and fixed in different directions and which preferably have rectangular cross-section, said section having a greater inner height than the height of the cross-section of the crossbars etc. The projections on the crossbars preferably constitute the heads of screws screwed into the crossbars, whereby the size of said heads is adapted to the recesses in the casings, advantageously constituting holes through the casing walls.

Easily dismounted stages may be built up by means of joint elements according to the invention. After the crossbars have been cut to desirable lengths, their ends are introduced into the corresponding casings, whereupon screws are introduced into the holes in the casings and screwed into the crossbars far enough for the underside of the screw heads to be brought into contact with the crossbars. The cross-section of the casing, in relation to the cross-section of the crossbars, should be big enough to enable the crossbars, with screwed-in stop screws, to be freely conveyed out of the casings. In order to cause a firm grip between the crossbars and the joint elements, the crossbars are, under tightening of the set screws, pressed against that part of the casings, where those holes are situated, through which the set screws were screwed into the crossbars. As soon as the crossbars have got a length desirable for a certain boat and the locking screws are screwed into the crossbars, one can easily mount or dismount a stage simply by tightening or releasing just one set screw at each crossbar end.

With reference to the attached drawings one embodiment of the invention will now be described. The figures show FIG. 1 a stage for covering of boats assembled by means of joint elements according to the invention, FIG. 2 in perspective a joint element constituted to form a corner nock at one gable, FIG. 3 a cross-section of one casing in FIG. 2, FIG. 4 in perspective a joint element, constituted to be mounted at an arbitrary nock between the gables, and FIG. 5 also in perspective a joint element, constituted to be used at an outer corner of the stage.

As shown in FIG. 1, a stage is assembled by means of joint elements 11, 12, 13 and 14, whereby the stage is supported by stands 15. By means of crossbars which are assembled by the joint elements 13, 14, a main bar is obtained and by means of cross bars, which are assembled by the joint elements 11 and 12, a crest is obtained. Crossbars 18 running between the crest and the main bar form rafters.

Figure 2:
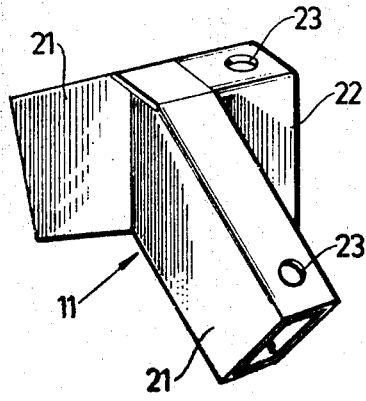
Figure 3:
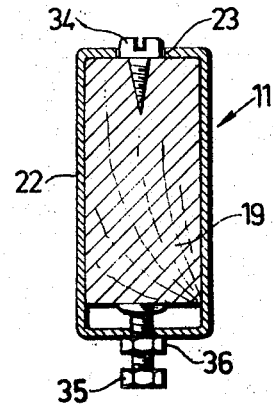

The joint element shown in FIG. 2 is constituted to joint crossbars in order to form a nock at the one gable of the stage, i.e., the element shown at 11 in FIG. 1. The joint element is composed of two casings 21 for the rafter crossbars (18 in FIG. 1) and a casing 22 for a crest crossbar (19 in FIG. 1). In the joint elements and in the crossbars there are arranged devices for keeping the crossbars in the joint elements, which devices are shown in FIG. 3. All of the casings forming a joint element show holes 23 for receiving the stop screw heads 34, which are screwed down flash to the surface of the crossbars. The stop screws are thereby intended to be screwed into the cross bars far enough so as to be brought in contact with the crossbars. The holes 23 in the casings are big enough for the heads to pass through them. Directly opposite the hole 23 in the casing, seen in their cross-section, a clamping screw is arranged, which is provided with a stop nut 36.

Figure 4:
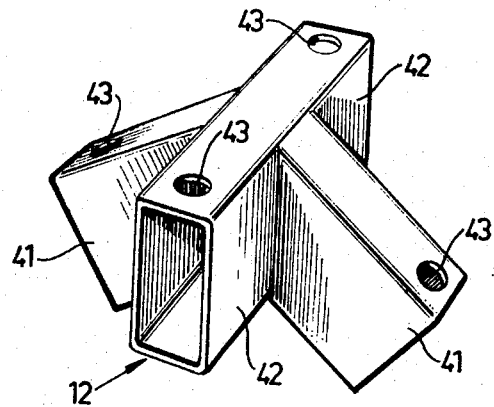
Figure 5:
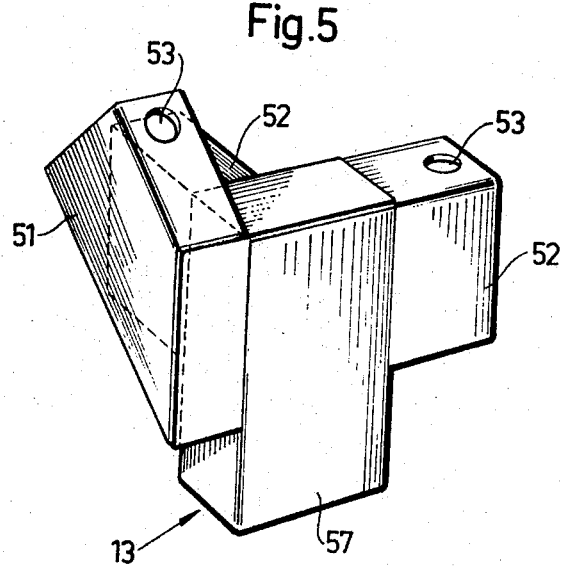

The joint element shown in FIG. 4 is constituted to mutually interconnect the different cross bars (19 in FIG. 1), which together are meant to form the crest and is composed of casings 42 for said crossbars as well as casings 41 for the rafter cross bars. Said casings show, in the same way as the casing in FIG. 2, holes 43 for receiving stop screws in the crossbars and, not shown in the drawing, clamping screws with stop nuts in the crossbars corresponding to the devices 35 and 36 in FIG. 3. In a similar way the joint element shown in FIG. 5 shows casings 51 for rafter crossbars and casings 52 for main bar crossbars and said casings also show holes 53 for receiving stop screws in the crossbars as well as clamping screws and stop nuts, not shown in the drawings. Said joint element is constituted to form an outer corner in the stage, e.g., a corner 13 in FIG. 1, and is thus provided with a casing 57, constituted to receive one end of the stands 15 in FIG. 1, which support the stage.

Still another joint element 14, shown only in FIG. 1, is constituted in the same way being composed of casings in order to interconnect the longitudinal crossbars 17, which form the main bar, to receive the lower end of a rafter crossbar 18 and to receive the upper end of a stand 15.

The joint elements according to the invention make it possible to assemble crossbars in an exceptionally effective way in order to form a stable stage, which is easy to mount and dismount. A stage assembled by means of said joint elements can be adapted to boats of very varying sizes. When a stage is built up for the first time, whereby the crossbars are cut into desired lengths, the stage is easy to dismount and to have remounted by just one person and even with a very plain tool.

Although the invention has been described with reference given to one embodiment, it can be arbitrarily varied within the scopes of the following claims.

What is claimed is:

1. A structural framework capable of being put together and taken apart repeatedly with little damage to the components thereof comprising:

a plurality of frame members, each of said frame members having a fixed projection on the outside thereof near at least one end thereof, and a plurality of joint elements for releasably joining said frame members, each of said joint elements comprising a body having a plurality of cavities therein, each of said cavities having a recess in the periphery thereof which is shaped to receive one of said fixed projections, being shaped to receive an end of one of said frame members but having a cross-section enough greater than the cross-section of said end of said frame member so that said end of frame member, including said fixed projection thereon, can be freely conveyed in and out of said cavity and a plurality of extendable elements, each of said extendable elements being mounted on said body and extendable into one of said cavities to bear against the surface of said end of said frame member in a manner tending to cause said fixed projection to seat into said recess, whereby said structural framework can be put together by positioning the ends of said frame members in said cavities and subsequently extending said extendable elements into said cavities and can be taken apart by withdrawing said extendable elements from said cavities and subsequently removing the ends of said frame member from said cavities.

2. A structural framework as claimed in claim 1 wherein said extendable elements comprise set screws.

3. A structural framework as claimed in claim 2 wherein each of said set screws engages a bearing element, which bearing element in turn engages one of said frame members, whereby the force of the engagement is distributed over a larger area of said frame member than the area of the tip of said set screw.

4. A structural framework as claimed in claim 1 wherein said body has at least three of said cavities.

5. A structural framework as claimed in claim 1 wherein said fixed projections are the heads of screws which are screwed down into said frame member.

6. A structural framework as claimed in claim 1 wherein said ends of said frame members and said cavities are rectangular in cross-section, said fixed projection is located on a short side of said rectangular end of said frame member, and the height of said cavity is greater than the combined height of said rectangular frame member and said fixed projection thereon.

* * * * *